United States Patent [19]

Mascarelli et al.

[11] Patent Number: 5,048,544
[45] Date of Patent: Sep. 17, 1991

[54] CIGARETTE SUBSTITUTE

[76] Inventors: Robert Mascarelli; Gloria Mascarelli, both of 31 Westbridge Dr., Holbrook, N.Y. 11741

[21] Appl. No.: 566,161
[22] Filed: Aug. 10, 1990
[51] Int. Cl.⁵ .......................... A24D 1/00; A24F 47/00
[52] U.S. Cl. .................................... 131/270; 131/271; 131/359
[58] Field of Search ............... 131/329, 359, 330, 270, 131/271

[56] References Cited

U.S. PATENT DOCUMENTS 3,584,630  6/1971  Inskeep ............................... 131/335
4,800,903  1/1989  Ray et al. ............................ 131/270

Primary Examiner—V. Millin
Attorney, Agent, or Firm—Edwin D. Schindler

[57] ABSTRACT

A cigarette substitute of the present invention is disclosed which provides an edible portion having a small amount of a nicotine composition sufficient to satisfy the desires of the cigarette smoker. The edible portion should preferably be in the shape and size of a familiar object, thereby reinforcing an already familiar form of behavior, while supplying the ingredient which would appease the individual's need for nicotine. Preferably, the edible portion of the present invention would be shaped in the form of a conventional lollypop which would preferably have a hard semi-hard candy. Optionally, the edible portion of the invention would be pleasantly flavored in an assortment of fruit choices in either a sugar or sugar-based substitute. Alternatively, the edible portion of the invention in a mint which could provide a taste which is somewhat analogous to that of menthol.

6 Claims, 1 Drawing Sheet

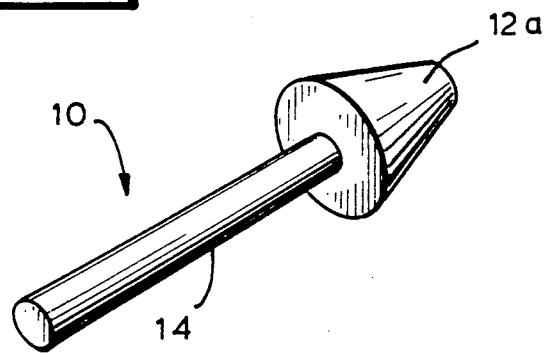
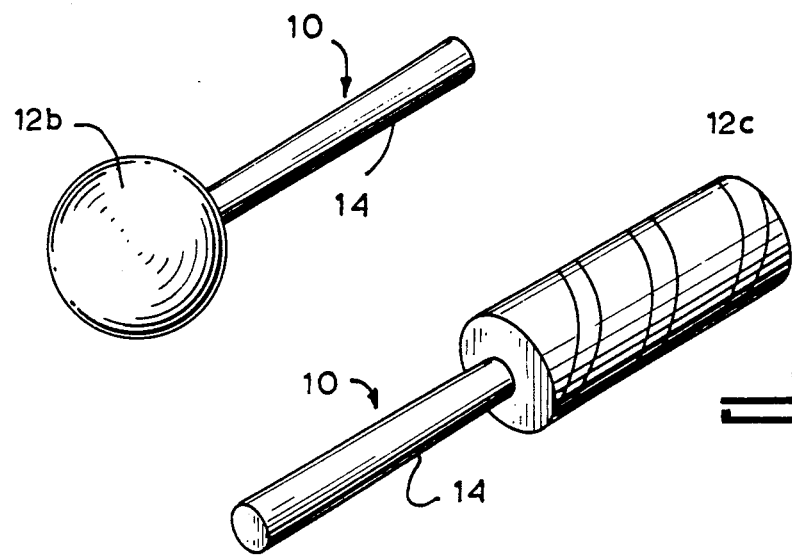
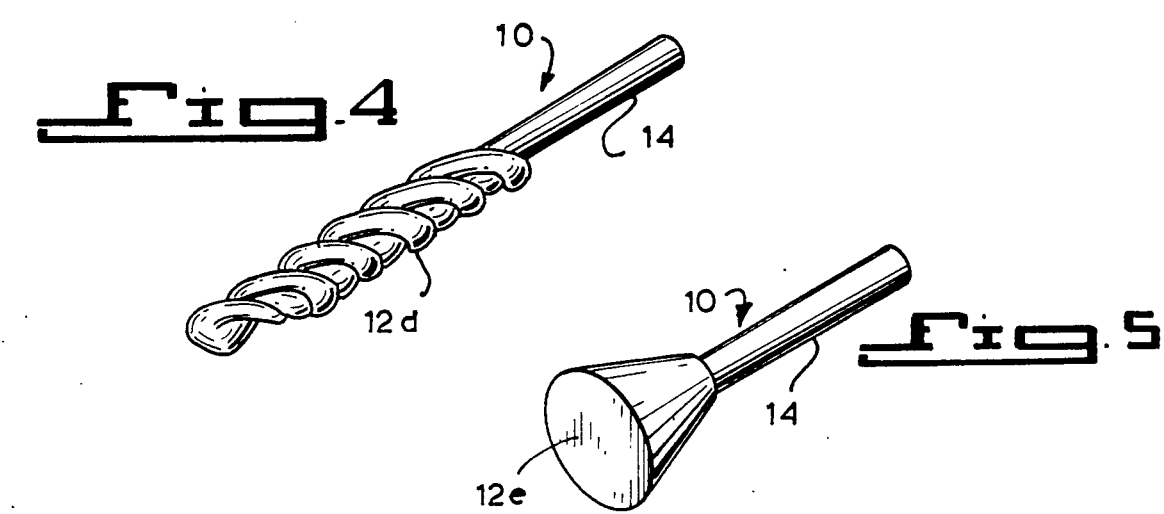

CIGARETTE SUBSTITUTE

BACKGROUND OF THE INVENTION

1. Technical Field of the Invention

The present invention relates, generally, to a novel cigarette substitute.

More particularly, the present invention relates to a cigarette substitute for persons who smoke and find themselves in social and business settings where smoking is generally prohibited. In addition, the cigarette substitute of the present invention is intended to act as a product that could be used for those wishing to wean themselves away from the cigarette smoking habit.

The invention expands upon the pshychological concept that much of the need for a smoker to smoke a cigarette is related to the fulfillment of an oral fixation and the need of the smoker to have something that resembles a cigarette to place in and out of one's mouth in a ritualistic manner.

The present invention therefore provides for a candy-type of cigarette substitute composition held by the smoker by means of a stick-like object that would preferably resemble a conventional cigarette. By means of the stick-like object, the smoker would obtain the psychological benefit of having, and handling, a cigarette, which very often is as important the nicotine received by the smoker from smoking.

2. Description of the Prior Art

In the present day, smoking has become frowned upon as a habit which is a danger to the health of those who actually smoke cigarettes, as well as those in the vicinity of the cigarette smoker who, against their wills, are often exposed to so called "second hand" smoke, which has proven dangers to the well-being of such other persons.

As a result, cigarette smoking has been banned, or severely restricted, in many public buildings, transportation, restaurants, etc., as well as in many areas in the private sector. As a consequence, the cigarette smoker often views himself, and is viewed by others, as an outcast in many social and business circles.

Accordingly, a clear need has developed to satisfy the cravings of the cigarette smoker, those persons who may smoke, but wish to quit smoking, and non-smokers, who wish to avoid second hand smoke and the attendant dangers therefrom.

Heretofore, substitutes for cigarettes commercially available generally rely upon prescription nicotine gum, chemical tablets or vitamins, however, none of the cigarette substitute compositions presently available fulfill the psychological need of the smoker to have something that resembles a cigarette to place in and out of one's mouth in a ritualistic manner.

Cigarette substitutes, such as plastic cigarettes, though having the correct shape do not provide a taste or an ingredient to satisfy the craving of the smoker for nicotine.

Cigarette substitute compositions are generally known to the prior art which afford the cigarette smoker a nicotine release. An example of one such nicotine substitute composition is disclosed in U.S. Pat. No. 3,901,248, issued on Aug. 26, 1975, to Lichtneckert et. al. This prior art reference discloses a chewable gum-based and nicotine cation exchange resin composition dispersed in such base, which affords the cigarette smoker a nicotine release when chewed.

The nicotine substitute composition of U.S. Pat. No. 3,901,248, being a gum which may only be chewed, cannot readily be removed and replaced by the cigarette smoker, as is the case with the present invention, described in detail hereinafter, and, therefore, is not capable of affording the psychological release to the smoker which may be at least as important as satisfying the smoker's desire for nicotine.

In view of the serious health effects caused by cigarette smoking, the increasing number of restrictions placed upon smokers and the desire for many who smoke to quit the habit, there is a substantial need for a cigarette substitute which provides the cigarette smoker with both a measured amount of the nicotine necessary to satisfy his or her craving for such substance, as well as fulfillment of the ancillary psychological effects, which are often the only benefits of cigarette smoking.

To date, the prior art has lacked such an article. In view of the importance of the relevant subject matter of concern, it is quite surprising that a single article has not been developed for attending to the several needs of the smoker heretofore described.

SUMMARY OF THE INVENTION

It is, therefore, an object of the present invention to provide a cigarette substitute. which fulfills both the physical requirement of the smoker for at least a minimal amount of nicotine and attends to the psychological benefits which smoking often provides those who choose to smoke.

It is a further object of the present invention to provide a cigarette substitute which provides the smoker having a desire to quit smoking the opportunity to wean himself or herself from the smoking habit.

It is, yet, an additional object of the present invention to provide a cigarette substitute which may be produced and offered for sale in an economical fashion.

The foregoing and related objects are accomplished by the cigarette substitute of the present invention which provides an edible portion having a small amount of a nicotine composition sufficient to satisfy the desires of the cigarette smoker. The edible portion should preferably be in the shape and size of a familiar object, thereby reinforcing an already familiar form of behavior, while supplying the ingredient which would appease the individual's need for nicotine.

Preferably, the edible portion of the present invention would be shaped in the form of a conventional lollypop which would preferably have a hard semi-hard candy. Optionally, the edible portion of the invention would be pleasantly flavored in an assortment of fruit choices in either a sugar or sugar-based substitute. Alternatively, the edible portion of the invention in a mint which could provide a taste which is somewhat analogous to that of menthol.

The nicotine substitute composition of the edible portion of the invention may have a chemical composition similar to that of the prior art nicotine substitute composition disclosed by Lichtneckert et. al., U.S. Pat. No. 3,901,248, issued Aug. 26th, 1975. U.S. Pat. No. 3,901,248 discloses a smoking substitute composition which includes a nicotine cation exchange resin complex dispersed in a base. It is the nicotine cation exchange resin complex which affords the nicotine release. The disclosure of U.S. Pat. No. 3,901,248 shall be considered as being incorporated by reference into the instant disclosure, as it pertains to the composition of a smoking substitute composition.

The edible portion of the cigarette substitute of the present invention preferably provides the equivalent of nicotine to the user of approximately 0.1 mg, i.e., similar to the nicotine ordinarily received from a low nicotine cigarette.

A second portion of the article of the present invention is a handle portion which holds the edible portion and which preferably is made to have the size, shape and feel of a conventional cigarette.

Other objects and features of the present invention will be described in connection with the accompanying drawing figures which are intended to illustrate preferred embodiments of the present invention. It should, of course, be recognized that the accompanying drawing figures are intended to illustrate preferred embodiments of the present invention and are not intended as a means for defining the limits and scope thereof.

BRIEF DESCRIPTION OF THE DRAWING FIGURES

In the drawing, wherein similar reference numerals denote similar features throughout the several views:

FIGS. 1-5 illustrate certain preferred shapes of the edible portion of the cigarette substitute article of the present invention.

DETAILED DESCRIPTION OF THE DRAWING FIGURES

Turning now, in detail, to the accompanying drawing figures, FIGS. 1-5 illustrate various preferred embodiments, or shapes of the edible portion 12 of the cigarette substitute article 10 of the present invention.

Article 10 is comprised of both an edible portion 12, which includes a nicotine substitute composition and a handle portion 14, which is preferably constructed with dimensions similar to those of a conventional cigarette. In this manner, the smoker may attain the psychological and physical benefits, or sensations, of smoking a real cigarette, without many of the drawbacks of conventional cigarettes. In addition, other persons will no longer be troubled with second-hand smoke.

FIGS. 1-5 illustrate various shapes for the edible portion, such shapes being designated by the reference numerals 12a, 12b, 12c, 12d, 12e. Such shapes include truncated cones 12a, 12e; spherical 12b; cylindrical 12c; and, conical 12d. The edible portion of the present invention may be provided in various other shapes beyond simply those shown in the accompanying drawing figures.

While only several embodiments of the present invention have been shown and described, it will be obvious to those of ordinary skill in the art that many modifications may be made to the present invention without departing from the spirit and scope thereof.

What is claimed is:

1. A cigarette substitute, comprising:
   and edible lollypop portion containing a smoking substitute composition having nicotine; and,
   a handle portion attached to said edible lollypop portion, said handle portion having substantially the size and shape of a cigarette.

2. The cigarette substitute according to claim 1, wherein said edible portion is in the shape of a spherical lollypop.

3. The cigarette substitute according to claim 1, wherein said edible portion is in the shape of a truncated cone lollypop.

4. The cigarette substitute according to claim 1, wherein said edible portion is in the shape of a spiral lollypop.

5. The cigarette substitute according to claim 1, wherein said edible portion is in the shape of a cylindrical lollypop.

6. The cigarette substitute according to claim 1, wherein said edible portion includes a cation exchange resin complex for providing a nicotine release.

* * * * *